(12) United States Patent
Chen et al.

(10) Patent No.: US 12,509,595 B2
(45) Date of Patent: Dec. 30, 2025

(54) COMPOSITE MATERIAL COMPRISING AN OXIDE OF ZINC AND TITANIUM, FILM AND LIGHT-EMITTING DEVICE

(71) Applicant: INDUSTRIAL TECHNOLOGY RESEARCH INSTITUTE, Hsinchu (TW)

(72) Inventors: Hsiang-Jui Chen, Hsinchu (TW); Han-Cheng Yeh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 793 days.

(21) Appl. No.: 17/691,370

(22) Filed: Mar. 10, 2022

(65) Prior Publication Data

US 2023/0170450 A1    Jun. 1, 2023

(30) Foreign Application Priority Data

Nov. 26, 2021  (TW) .................................. 110144140
Dec. 24, 2021  (CN) ........................... 202111598555.7

(51) Int. Cl.
| | |
|---|---|
| C09D 7/65 | (2018.01) |
| C09D 7/40 | (2018.01) |
| C09D 7/62 | (2018.01) |
| H10H 20/854 | (2025.01) |

(52) U.S. Cl.
CPC ................. C09D 7/67 (2018.01); C09D 7/62 (2018.01); H10H 20/854 (2025.01); Y10T 428/2995 (2015.01)

(58) Field of Classification Search
CPC . C09C 1/0084; C09C 1/3607; C01P 2004/64; Y10T 428/2991; Y10T 428/2995
See application file for complete search history.

(56) References Cited

U.S. PATENT DOCUMENTS

| | | | |
|---|---|---|---|
| 8,648,130 B2 | 2/2014 | Hasegawa et al. | |
| 8,883,935 B2 | 11/2014 | Lalgudi et al. | |
| 9,856,361 B2 * | 1/2018 | Otsuka | H10H 20/854 |
| 10,033,014 B2 | 7/2018 | Chen et al. | |
| 10,753,012 B2 | 8/2020 | Xu et al. | |
| 2007/0297998 A1 * | 12/2007 | Meyer | A61K 8/27 424/59 |
| 2010/0271699 A1 | 10/2010 | Chang et al. | |
| 2014/0147684 A1 | 5/2014 | Kwak et al. | |
| 2019/0322574 A1 | 10/2019 | Liang | |
| 2020/0083485 A1 | 3/2020 | Chen et al. | |

FOREIGN PATENT DOCUMENTS

| | | | |
|---|---|---|---|
| CN | 101001924 A | 7/2007 | |
| CN | 101798183 A | 8/2010 | |
| CN | 104018381 A | 9/2014 | |
| CN | 104478231 A | 4/2015 | |
| CN | 107075289 A | 8/2017 | |
| CN | 107583489 A | 1/2018 | |
| CN | 111704748 A | 9/2020 | |
| CN | 112876896 A | 6/2021 | |
| EP | 1138632 A1 * | 10/2001 | .......... B01J 37/0232 |
| EP | 1138632 B1 * | 10/2009 | ............ B01J 21/063 |
| TW | 530171 B | 5/2003 | |
| TW | I225881 B | 1/2005 | |
| TW | I562409 B | 12/2016 | |
| TW | I645022 B | 12/2018 | |

OTHER PUBLICATIONS

Ahangaran, Recent advances in chemical surface modification of metal oxide nanoparticles with silane coupling agents: A review, Advances in Colloid and Interface Science xxx (xxxx) 102298 (Year: 2020).*
Translation Copy of EP-1138632 (Year: 2009).*
Translation Copy of CN-112876896 (Year: 2021).*
Taiwanese Office Action and Search Report for Taiwanese Application No. 110144140, dated Jun. 9, 2022.
Chinese Office Action and Search Report for Chinese Application No. 202111598555.7, dated May 22, 2025.

* cited by examiner

*Primary Examiner* — Hoa (Holly) Le
(74) *Attorney, Agent, or Firm* — Birch, Stewart, Kolasch & Birch, LLP

(57) ABSTRACT

A composite material includes a core particle and a silane coupling agent including a double-bond or an epoxy group grafted onto the surface of the core particle. The core particle includes an oxide of zinc and titanium, and zinc and titanium have a weight ratio of 1:0.4 to 1:0.9. The composite material may react with a radical initiator or a crosslinker to form a film, and the film can be used to cover a light-emitting element of a light-emitting device.

19 Claims, No Drawings

COMPOSITE MATERIAL COMPRISING AN OXIDE OF ZINC AND TITANIUM, FILM AND LIGHT-EMITTING DEVICE

CROSS REFERENCE TO RELATED APPLICATIONS

The present application is based on, and claims priority from, Taiwan Application Serial Number 110144140, filed on Nov. 26, 2021 and China Application Serial Number 202111598555.7, filed on Dec. 24, 2021, the disclosure of which are hereby incorporated by reference herein in its entirety.

TECHNICAL FIELD

The technical field relates to a film, and in particular it relates to a composite material for the film.

BACKGROUND

It is difficult for a pure organic polymer to have a high refractive index. Inorganic coating film has a high refractive index, but it encounters processing difficulties in certain applications due to its low flexibility and high density (e.g. >2.5 cm$^3$). Accordingly, it is necessary to design a novel film composition to combine the advantages of the organic material and the inorganic material for application as a film with a high refractive index.

SUMMARY

One embodiment of the disclosure provides a composite material, including: a core particle; and a silane coupling agent including a double-bond or an epoxy group grafted onto the surface of the core particle, wherein the core particle includes an oxide of zinc and titanium, and zinc and titanium have a weight ratio of 1:0.4 to 1:0.9.

One embodiment of the disclosure provides a film, being formed by reacting a composite material with a radical initiator, wherein the composite material includes: a core particle; and a silane coupling agent including a double-bond grafted onto the surface of the core particle, wherein the core particle includes an oxide of zinc and titanium, and zinc and titanium have a weight ratio of 1:0.4 to 1:0.9.

One embodiment of the disclosure provides a film, being formed by reacting a composite material with a crosslinker, wherein the composite material includes: a core particle; and a silane coupling agent including an epoxy group grafted onto the surface of the core particle, wherein the core particle includes an oxide of zinc and titanium, and zinc and titanium have a weight ratio of 1:0.4 to 1:0.9.

One embodiment of the disclosure provides a light-emitting device, including: a light-emitting element, and the described film covering the light-emitting element.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a composite material, including: a core particle; and a silane coupling agent including a double-bond or an epoxy group grafted onto the surface of the core particle. The core particle includes an oxide of zinc and titanium, and zinc and titanium have a weight ratio of 1:0.4 to 1:0.9, such as 1:0.48 to 1:0.9. If the amount of zinc is too high, the solid will easily precipitate during the reaction, and a stable crystal state of the core particle will not be easily kept. If the amount of titanium is too high, the core particles will quickly gel during the reaction and cannot be used.

In one embodiment, the core particle is formed by hydrolyzing a zinc source to form zinc oxide, and then condensing with a titanium source to form the core particle. The core particle mainly includes zinc, titanium, and oxygen (e.g. and oxide of zinc and titanium). The surface of the core particle includes a plurality of hydroxy groups. Subsequently, a silane coupling agent including a double bond or an epoxy group is reacted with the core particles, such that the Si—O-alkyl group of the silane is reacted with —OH group on the surface of the core particle to form Zn/Ti—O—Si bonding and alkyl alcohol, in which the silane coupling agent is grafted onto the surface of the core particle. Note that the above reaction is one way and not the only way to form the composite particle. One skilled in the art may adopt suitable reactants to form the described composite material.

In some embodiments, the zinc source can be zinc acetate, zinc perchlorate, or zinc bromide. In some embodiments, the titanium source can be titanium isopropoxide, titanium tetrachloride, or titanium butoxide.

In some embodiments, the total weight of zinc and the titanium in the core particle and the weight of the silane coupling agent including the double-bond or the epoxy group have a ratio of 1:0.1 to 1:3, or 1:0.1 to 1:1.5. If the amount of the silane coupling agent is too low, the film cannot be formed. If the amount of the silane coupling agent is too high, the refractive index of the film will be insufficient (e.g. less than 1.7).

In some embodiments, the core particle before or after grafting the silane coupling agent including the double-bond or the epoxy group has an average diameter of 10 nm to 80 nm, or 15 nm to 55 nm. If the average diameter of the core particle is too small, the high refractive index of the film will not be easily achieved. If the average diameter of the core particle is too large, the light-transmittance of the film will be lower (e.g. less than 90%) and cannot enhance the light extraction effect.

In some embodiments, the core particle (e.g. without grafting the silane coupling agent including the double-bond or the epoxy group) has an average diameter of 10 nm to 80 nm, such as 15 nm to 55 nm.

In some embodiments, the core particle grafting the silane coupling agent including the double-bond or the epoxy group has an average diameter of 10 nm to 80 nm, such as 11 nm to 80 nm, 16 nm to 56 nm, or 15 nm to 55 nm.

In some embodiments, the silane coupling agent including the double-bond can be 3-(trimethoxysilyl) propyl acrylate, 3-isocyanatopropyltriethoxysilane, or

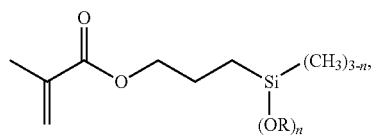

wherein each R is independently methyl or ethyl, and n is 1-3. In some embodiments, the silane coupling agent including the epoxy group can be (3-glycidyloxypropyl)trimethoxysilane, (3-glycidyloxypropyl)triethoxysilane, (3-glycidyloxypropyl)dimethoxymethylsilane, (3-glycidyloxypropyl)diethoxymethylsilane, β-(3,4-epoxycyclohexane)ethyl trimethoxysilane, or β-(3,4-epoxycyclohexane)ethyltriethoxy silane.

One embodiment of the disclosure provides a film, being formed by reacting a composite material with a radical initiator, wherein the composite material includes: a core particle; and a silane coupling agent including a double-bond grafted onto the surface of the core particle, wherein the core particle includes an oxide of zinc and titanium, and zinc and titanium have a weight ratio of 1:0.4 to 1:0.9. The amount of the radical initiator could be catalytic amount. For example, the composite material and the radical initiator may have a weight ratio of 1:0.09 to 1:0.13. The radical initiator can be thermal initiator or photo initiator, which may produce radicals by exposure or heating to crosslink the double bond of the silane coupling agent. In some embodiments, the film has a thickness of 4 micrometers to 12 micrometers (or 5 micrometers to 8 micrometers), a refractive index of 1.7 to 2.5, and a light-transmittance of 90% to 100%. If the thickness of the film is too low, the film cannot efficiently protect the element that is covered by the film. If the refractive index of the film is too low, the light loss caused by the refractive index difference cannot be avoided when the film covers an element of high refractive index. If the light-transmittance of the film is too low, the film cannot serve as a transparent protective layer (e.g. a protective layer for covering the light-emitting element).

One embodiment of the disclosure provides a film, being formed by reacting a composite material with a crosslinker, wherein the composite material comprises: a core particle; and a silane coupling agent including an epoxy group grafted onto the surface of the core particle, wherein the core particle includes an oxide of zinc and titanium, and zinc and titanium have a weight ratio of 1:0.4 to 1:0.9. The crosslinker may ring-open the epoxy group of the silane coupling agent to achieve the crosslinking effect. In some embodiments, the composite material and the crosslinker have a weight ratio of 1:0.09 to 1:0.13. If the amount of the crosslinker is too low, the designed structure cannot be synthesized during the reaction. If the amount of the crosslinker is too high, the refractive index of the film will be dramatically lowered. In some embodiments, the crosslinker is $C_2$-$C_6$ amine compound, $C_2$-$C_6$ alcohol compound, or $C_2$-$C_6$ acid compound. In some embodiments, the crosslinker is HO—$(CH_2)_n$—$NH_2$, and n is 2 to 4. In some embodiments, the film has a thickness of 4 micrometers to 12 micrometers (or 5 micrometers to 8 micrometers), a refractive index of 1.7 to 2.5, and a light-transmittance of 90% to 100%. If the thickness of the film is too low, the film cannot efficiently protect the element that is covered by the film. If the refractive index of the film is too low, the light loss caused by the refractive index difference cannot be avoided when the film covers an element of high refractive index. If the light-transmittance of the film is too low, the film cannot serve as a transparent protective layer (e.g. a protective layer for covering the light-emitting element).

One embodiment of the disclosure provides a light-emitting device, including: a light-emitting element, and the described film covering the light-emitting element. Since the film in the embodiment of the disclosure has sufficient thickness, refractive index, and light-transmittance, the film may efficiently protect the light-emitting element. In some embodiments, the light-emitting element can be light-emitting diode, such as organic light-emitting diode, inorganic light-emitting diode, or another suitable light-emitting diode. Since the refractive index of the light-emitting element is usually higher than 2, if the film covering the light-emitting element has an overly low refractive index (e.g. less than 1.7), the refractive index difference will result in light loss. Note that the film of the disclosure is mainly applied to protect the light-emitting element in the light-emitting device, however, it should be understood that the film cam be used to protect the element that is not the light-emitting element and be not limited to protect the light-emitting element.

Accordingly, the organic-inorganic composite material of the disclosure may simultaneously include the advantages of the organic molecules (e.g. light-weight, flexibility, high impact resistance, and easy processability) and the inorganic materials (e.g. high refractive index such as n=2.0 to 2.5, high chemical resistance, and high thermal resistance). Through designing the composite material and modifying the surface functional groups, the refractive index can be tuned and the high light-transmittance can be kept. In short, the disclosed material composition for the film has high light-transmittance and high refractive index, and the film may have a certain thickness to achieve the effect of protecting the device.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In following Examples, the light transmittance of the film was measured with a UV/VIS spectrophotometer, in which the wavelength of 550 nm was set as the reference to measure the light-transmittance value. The refractive index of the film was measured with a thin film analyzer (N & K analyze). The diameter of the core particle was measured with a multi-sample nanoparticle size measurement system (Otsuka nanoSAQLA), in which the measurement range was 0.6 nm to 10 μm with an accuracy of +2%.

Example 1

5 g of zinc acetate, 20 g of isopropanol, and 1.9 g of ethanolamine were heated to 80° C. to be dissolved and reacted for 5 minutes. Subsequently, 10 g of titanium isopropoxide and 0.25 g of isopentanedione (e.g. acetylacetone) were added to the reaction mixture, and further reacted at 80° C. for 8 hours to form core particles having an average diameter of about 20 nm. The core particles included an oxide of zinc and titanium, and zinc and titanium have a weight ratio of 1:0.6. 0.9 g of (3-glycidyloxypropyl)trimethoxysilane was then added to perform a surface modification. The total weight of zinc and the titanium in the core particles and the weight of (3-glycidyloxypropyl)trimethoxysilane had a ratio of 1:1.25. The Si—O—$CH_3$ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. The core particles grafted with the silane coupling agent had an average diameter of 53.1 nm. Subsequently, the solution was spin-coated (1000 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 8 micrometers, a refractive index of 1.8, and a light-transmittance of 93.4%.

Example 2

5 g of zinc acetate, 20 g of isopropanol, and 1.9 g of ethanolamine were heated to 80° C. to be dissolved and reacted for 5 minutes. Subsequently, 10 g of titanium isopropoxide and 0.25 g of isopentanedione were added to the reaction mixture, and further reacted at 80° C. for 8 hours to form core particles having an average diameter of about 20 nm. The core particles included an oxide of zinc and titanium, and zinc and titanium have a weight ratio of 1:0.6. 0.3 g of (3-glycidyloxypropyl)trimethoxysilane was then added to the reaction mixture to perform a surface modification. The total weight of zinc and the titanium in the core particles and the weight of (3-glycidyloxypropyl)trimethoxysilane had a ratio of 1:0.42. The Si—O—CH₃ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. The core particles grafted with the silane coupling agent had an average diameter of 35.1 nm. Subsequently, the solution was spin-coated (1000 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 6 micrometers, a refractive index of 1.9, and a light-transmittance of 93.8%.

Example 3

5 g of zinc acetate, 20 g of isopropanol, and 1.9 g of ethanolamine were heated to 80° C. to be dissolved and reacted for 5 minutes. Subsequently, 10 g of titanium isopropoxide and 0.25 g of isopentanedione were added to the reaction mixture, and further reacted at 80° C. for 8 hours to form core particles having an average diameter of about 20 nm. The core particles included an oxide of zinc and titanium, and zinc and titanium have a weight ratio of 1:0.6. 0.15 g of (3-glycidyloxypropyl)trimethoxysilane was then added to perform a surface modification. The total weight of zinc and the titanium in the core particles and the weight of (3-glycidyloxypropyl)trimethoxysilane had a ratio of 1:0.2. The Si—O—CH₃ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. The core particles grafted with the silane coupling agent had an average diameter of 28.9 nm. Subsequently, the solution was spin-coated (1000 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 5 micrometers, a refractive index of 2.23, and a light-transmittance of 96.7%.

As shown in Examples 1 to 3, the more silane coupling agent was used (e.g. the more organic ratio of the composite particles) the lower refractive index and the greater thickness of the film resulted.

Example 4

4 g of zinc acetate, 20 g of isopropanol, and 1.4 g of ethanolamine were heated to 80° C. to be dissolved and reacted for 5 minutes. Subsequently, 11 g of titanium isopropoxide and 0.275 g of isopentanedione were added to the reaction mixture, and further reacted at 80° C. for 8 hours to form core particles having an average diameter of about 33.6 nm. The core particles included an oxide of zinc and titanium, and zinc and titanium have a weight ratio of 1:0.87. 0.15 g of (3-glycidyloxypropyl)trimethoxysilane was then added to perform a surface modification. The total weight of zinc and the titanium in the core particles and the weight of (3-glycidyloxypropyl)trimethoxysilane had a ratio of 1:0.23. The Si—O—CH₃ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. The core particles grafted with the silane coupling agent had an average diameter of 45.8 nm. Subsequently, the solution was spin-coated (100 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 6 micrometers, a refractive index of 1.95, and a light-transmittance of 96.2%.

Example 5

6 g of zinc acetate, 20 g of isopropanol, and 1.6 g of ethanolamine were heated to 80° C. to be dissolved and reacted for 5 minutes. Subsequently, 9 g of titanium isopropoxide and 0.21 g of isopentanedione were added to the reaction mixture, and further reacted at 80° C. for 8 hours to form core particles having an average diameter of about 18.8 nm. The core particles included an oxide of zinc and titanium, and zinc and titanium have a weight ratio of 1:0.48. 0.15 g of (3-glycidyloxypropyl)trimethoxysilane was then added to perform a surface modification. The total weight of zinc and the titanium in the core particles and the weight of (3-glycidyloxypropyl)trimethoxysilane had a ratio of 1:0.19. The Si—O—CH₃ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. The core particles grafted with the silane coupling agent had an average diameter of 27.8 nm. Subsequently, the solution was spin-coated (1000 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 7 micrometers, a refractive index of 1.82, and a light-transmittance of 94.9%.

Comparative Example 1

10 g of zinc acetate, 20 g of isopropanol, and 1.9 g of ethanolamine were heated to 80° C. to be dissolved and reacted for 5 minutes. Subsequently, 5 g of titanium isopropoxide and 0.20 g of isopentanedione were added to the reaction mixture, and further reacted at 80° C. The zinc and titanium have a weight ratio of 1:0.15. The initial reaction mixture was solidified and could not be stirred. As shown above, the overly high amount of zinc could not form the core particles.

Comparative Example 2

3 g of zinc acetate, 20 g of isopropanol, and 1.2 g of ethanolamine were heated to 80° C. to be dissolved and reacted for 5 minutes. Subsequently, 12 g of titanium isopropoxide and 0.30 g of isopentanedione were added to the reaction mixture, and further reacted at 80° C. The zinc and titanium have a weight ratio of 1:1.2. The solid precipitated during the reaction. As shown above, the overly high amount of titanium could not form the core particles.

Comparative Example 3

5 g of zinc acetate, 20 g of isopropanol, and 1.9 g of ethanolamine were heated to 80° C. to be dissolved and reacted for 5 minutes. Subsequently, 10 g of titanium isopropoxide and 0.25 g of isopentanedione were added to the reaction mixture, and further reacted at 80° C. for 8 hours to form core particles. The core particles included an oxide of zinc and titanium, and zinc and titanium have a weight ratio of 1:0.6. Subsequently, the solution was spin-coated (1000 rpm) on glass, baked at 80° C. for 5 minutes, and then heated to 150° C. and baked for 5 minutes. However, the coating was broken and could not form a film. As shown in Comparative Example 3, the core particles without surface modification with the silane coupling agent could not form a film.

Comparative Example 4

5 g of zinc acetate, 20 g of isopropanol, and 1.9 g of ethanolamine were heated to 80° C. to be dissolved and reacted for 5 minutes. Subsequently, 10 g of titanium isopropoxide and 0.25 g of isopentanedione were added to the reaction mixture, and further reacted at 80° C. for 8 hours to form core particles. The core particles included an oxide of zinc and titanium, and zinc and titanium have a weight ratio of 1:0.6. 3 g of (3-glycidyloxypropyl)trimethoxysilane was then added to the reaction mixture to perform a surface modification. The total weight of zinc and the titanium in the core particles and the weight of (3-glycidyloxypropyl)trimethoxysilane had a ratio of 1:4.2. The Si—O—CH$_3$ of the silane and the —OH on the surface of the core particles could react at 80° C. for 4 hours through hydrothermal method (in which the water came from trace amount of water in the solvent) to form Zn/Ti—O—Si bonding and methanol, such as the silane being grafted onto the surface of the core particles. Subsequently, the solution was spin-coated (1000 rpm) on glass, baked at 80° C. for 5 minutes, and then heated to 150° C. and baked for 5 minutes to form a film, in which the core particles grafted with the silane coupling agent reacted with the ethanolamine serving as the crosslinker. The film had a thickness of 15 micrometers, a refractive index of 1.52, and a light-transmittance of 92.2%. As shown in Comparative Example 4, the overly high amount of the silane coupling agent would result in the film having an insufficient refractive index.

Comparative Example 5

15 g of zinc acetate, 20 g of isopropanol, and 1.9 g of ethanolamine were heated to 80° C. to be dissolved and reacted for 8 hours to form core particles. The core particles included an oxide of zinc. Subsequently, the solution was spin-coated (1000 rpm) onto glass, baked at 80° C. to remove the solvent, and then heated to 150° C. and baked for 5 minutes to form a film. The film had a thickness of less than 5 micrometers, a refractive index of 1.6, and a light-transmittance of higher than 97%. As shown in Comparative Example 5, the film formed from the zinc oxide core particles without surface modification with the silane coupling agent had insufficient refractive index and thickness.

Comparative Example 6

15 g of titanium isopropoxide, 0.3 g of isopentanedione, 20 g of ethanol, and 1.9 g of ethanolamine were heated to 80° C. and reacted at 80° C. for 8 hours to form core particles. The core particles included an oxide of titanium. Subsequently, the solution was spin-coated (1000 rpm) on glass, baked at 80° C. to remove the solvent, and then heated to 150° C. and baked for 5 minutes to form white powder, which could not form a film. As shown in Comparative Example 6, the titanium oxide core particles without surface modification with the silane coupling agent could not form a film.

Comparative Example 7

7 g of zinc acetate, 20 g of isopropanol, and 1.9 g of ethanolamine were heated to 80° C. to be dissolved and reacted for 5 minutes. Subsequently, 8 g of titanium isopropoxide and 0.22 g of isopentanedione were added to the reaction mixture, and further reacted at 80° C. The zinc and titanium have a weight ratio of 1:0.36. The solid precipitated during the reaction. As shown above, the overly high amount of zinc could not form the core particles.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A composite material, comprising:
   a core particle; and
   a silane coupling agent including a double-bond or an epoxy group grafted onto a surface of the core particle, wherein the core particle includes an oxide of zinc and titanium, and zinc and titanium have a weight ratio of 1:0.6 to 1:0.9.

2. The composite material as claimed in claim 1, wherein the total weight of zinc and the titanium in the core particle and a weight of the silane coupling agent including the double-bond or the epoxy group have a ratio of 1:0.1 to 1:3.

3. The composite material as claimed in claim 1, wherein the core particle has an average diameter of 10 nm to 80 nm.

4. The composite material as claimed in claim 1, wherein the core particles having the surface grafted with the silane coupling agent including a double-bond or an epoxy group has an average diameter of 10 nm to 80 nm.

5. The composite material as claimed in claim 1, wherein the silane coupling agent including the double-bond comprises 3-(trimethoxysilyl) propyl acrylate, 3-isocyanatopropyltriethoxysilane, or

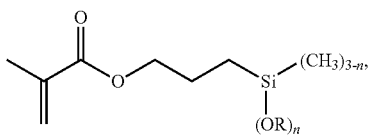

wherein R is methyl or ethyl, and n is 1-3.

6. The composite material as claimed in claim 1, wherein the silane coupling agent including the epoxy group comprises (3-glycidyloxypropyl)trimethoxysilane, (3-glycidyloxypropyl)triethoxysilane, (3-glycidyloxypropyl)dimethoxymethylsilane, (3-glycidyloxypropyl) diethoxymethylsilane, β-(3,4-epoxycyclohexane)ethyl trimethoxysilane, or β-(3,4-epoxycyclohexane)ethyltriethoxysilane.

7. A film, being:
formed by reacting the composite material as claimed in claim 1 with a radical initiator, wherein the silane coupling agent includes the double bond.

8. The film as claimed in claim 7, wherein the total weight of zinc and the titanium in the core particle and a weight of the silane coupling agent including the double-bond have a ratio of 1:0.1 to 1:3.

9. The film as claimed in claim 7, wherein the silane coupling agent including the double-bond comprises 3-(trimethoxysilyl) propyl acrylate, 3-isocyanatopropyltriethoxysilane, or

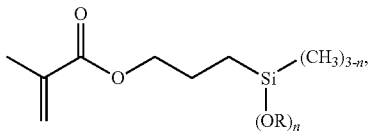

wherein R is methyl or ethyl, and n is 1-3.

10. The film as claimed in claim 7, having a thickness of 4 micrometers to 12 micrometers, a refractive index of 1.7 to 2.5, and a light transmittance of 90% to 100%.

11. A light-emitting device, comprising:
a light-emitting element, and
a film as claimed in claim 7 covering the light-emitting element.

12. A film, being:
formed by reacting the composite material as claimed in claim 1 with a crosslinker, wherein, the silane coupling agent includes the epoxy group.

13. The film as claimed in claim 12, wherein the total weight of zinc and the titanium in the core particle and a weight of the silane coupling agent including the the epoxy group have a ratio of 1:0.1 to 1:3.

14. The film as claimed in claim 12, wherein the silane coupling agent including the epoxy group comprises (3-glycidyloxypropyl)trimethoxysilane, (3-glycidyloxypropyl)triethoxysilane, (3-glycidyloxypropyl)dimethoxymethylsilane, (3-glycidyloxypropyl) diethoxymethyl silane, β-(3,4-epoxycyclohexane)ethyl trimethoxysilane, or β-(3,4-epoxycyclohexane)ethyltriethoxysilane.

15. The film as claimed in claim 12, wherein the composite material and the crosslinker have a weight ratio of 1:0.09 to 1:0.13.

16. The film as claimed in claim 12, wherein the crosslinker is $C_2$-$C_6$ amine compound, $C_2$-$C_6$ alcohol compound, or $C_2$-$C_6$ acid compound.

17. The film as claimed in claim 12, wherein the crosslinker is HO—$(CH_2)_n$—$NH_2$, and n is 2 to 4.

18. The film as claimed in claim 12, having a thickness of 4 micrometers to 12 micrometers, a refractive index of 1.7 to 2.5, and a light transmittance of 90% to 100%.

19. A light-emitting device, comprising:
a light-emitting element, and
a film as claimed in claim 12 covering the light-emitting element.

* * * * *